Figure 1:
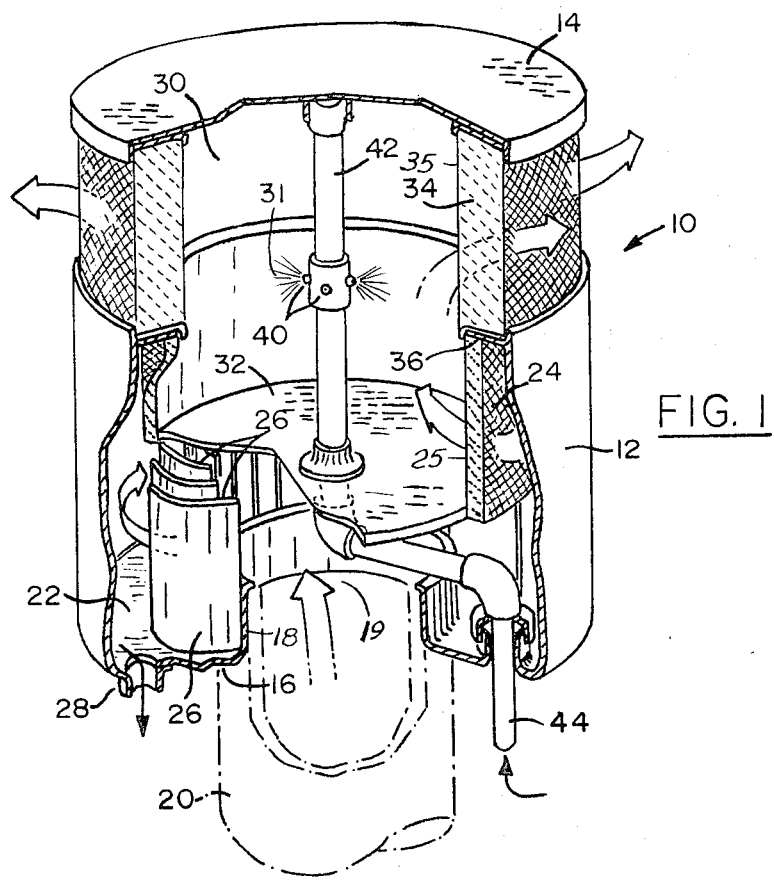

United States Patent [19]

Lampinen

[11] 3,812,657

[45] May 28, 1974

[54] AIR POLLUTION DEVICE

[76] Inventor: Leo Kalevi Lampinen, 25 Northy Dr., Toronto, Ontario, Canada

[22] Filed: July 6, 1972

[21] Appl. No.: 251,368

[52] U.S. Cl............ 55/223, 55/233, 55/238, 55/259, 261/79 A, 261/105
[51] Int. Cl............................ B01d 47/06
[58] Field of Search...55/90, 93, 94, 223, 233–238, 55/257–259; 261/79 A, 98, 105

[56] References Cited
UNITED STATES PATENTS

| | | | |
|---|---|---|---|
| 2,210,429 | 8/1940 | Pietzsch | 261/106 |
| 2,601,519 | 6/1952 | Hardy et al. | 55/233 X |
| 2,643,105 | 6/1953 | Lipowitz | 55/DIG. 20 |
| 2,970,671 | 2/1961 | Warner | 55/238 X |
| 3,142,548 | 7/1964 | Krantz | 55/223 X |
| 3,526,082 | 9/1970 | Thuillier | 55/235 |

FOREIGN PATENTS OR APPLICATIONS 343,587  11/1921  Germany .......................... 55/236

*Primary Examiner*—Frank W. Lutter
*Assistant Examiner*—Vincent H. Gifford

[57] ABSTRACT

A method and apparatus for scrubbing industrial stack gas streams for the effective removal of pollutants consisting of solid particulate, vapours and mist therefrom comprising subjecting the gas stream to a centrifugal action by a cyclone effect, passing the gas stream through a liquid-wetted filter counter-current to a liquid spray, passing said gas stream through a liquid-mist zone and passing said gas stream through a second liquid-wet filter co-current to a liquid spray, whereby a substantially clean gas stream and a liquid stream containing pollutants are separately discharged.

2 Claims, 2 Drawing Figures

PATENTED MAY 28 1974 3,812,657

AIR POLLUTION DEVICE

This invention relates to a method and apparatus for scrubbing gas and is particularly directed to a novel method and apparatus for the removal of solid particulate, vapours and mist from industrial stack gas streams.

The pollution of the atmosphere by discharge thereinto of noxious vapours and mist and solid particulate presents a serious environmental problem due to the accumulative deleterious effects of the pollutants in large industrial areas. Many techniques and complex equipment have been developed and used for the purpose of minimizing air pollution but heretofore such techniques have been ineffective for the intended purpose or the equipment has been prohibitively expensive, complex in construction, bulky in size and weight, and subject to constant maintenance and repair.

I have discovered a novel method and apparatus for scrubbing industrial waste stack gases which substantially overcome problems inherent in existing equipment and which are surprisingly effective in the continuous removal of solid particulate, vapours and mist therefrom by the use of light-weight and relatively small and simple apparatus which can be readily affixed to a gas duct or stack.

In general, my method, as provided by the apparatus of my invention, comprises subjecting a gas stream to be scrubbed to centrifugal action by use of a cyclone effect in an annular chamber having a generally circular, liquid-wetted peripheral wall for removal of a portion of said solid particulate and mist by impingement of said solid particulate and mist on said peripheral wall; passing said gas stream through a circular, liquid-wetted filter for the entrainment and removal of substantially all remaining solid particulate and mist; passing said gas stream through a liquid-mist zone for absorption of remaining mist and noxious vapours; passing said gas stream through a second circular, liquid-wetted filter for removal of any residual solid particulate and mist or liquid droplets discharging said gas, substantially scrubbed of solid particulate, noxious vapours and mist to the atmosphere; and collecting and discharging liquid from said peripheral chamber wall, filter and liquid-mist zone collected in said annular chamber.

It is a principal object of the present invention therefor to provide a simple and effective method for the removal of solid particulate, noxious vapours and mist from industrial stack gases.

It is another object of the present invention to provide a simple, inexpensive and relatively compact apparatus for the removal of said pollutants from industrial stack gases.

And another object of the present invention is the provision of an apparatus for scrubbing industrial stack gases which is self-cleaning and substantially free of maintenance for efficient removal of air pollutants therefrom.

Figure 2:
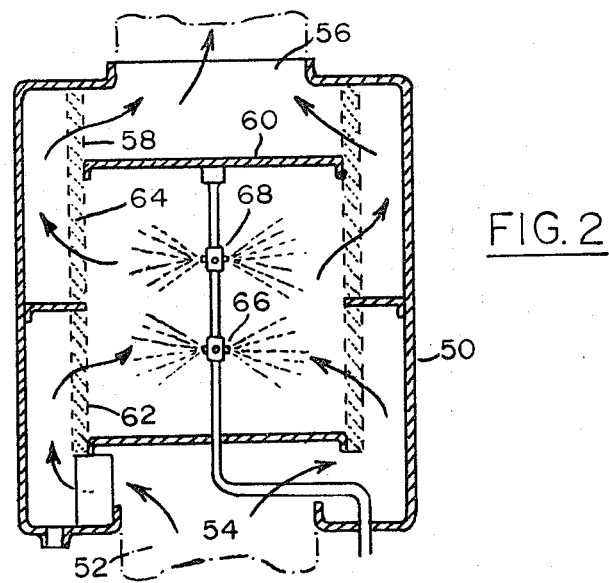

These and other objects of the present invention and the manner in which they can be attained will become apparent from the following detailed description of the accompanying drawing, in which:

FIG. 1 is a perspective view, partly cut away, of an embodiment of the present invention showing the structural and functional relationship of the component parts; and FIG. 2 is a sectional view of a second embodiment of the present invention indicating schematically gas stream flow through the apparatus.

The apparatus of the present invention comprises a housing designated generally by the numeral 10 having an outer cylindrical wall 12, cover 14, base 16, and inner flanged wall 18 defining inlet 19. Flanged wall 18 is adapted to receive a gas duct or exhaust stack 20 centrally within housing 10 in concentric, axial alignment therewith.

An annular chamber 22 is defined between outer wall 12, and inner wall 18 and circular filter 24. Deflector vanes 26 are arranged about the interior of chamber 22 adjacent wall 18 whereby a gas stream from duct or stack 20, as designated by the arrow, is imparted a rotational flow within chamber 22. An outlet 28 is formed in the bottom wall 16 for drainage of liquid therefrom, as will become evident as the description proceeds.

A closed central chamber 30 is formed in the upper portion of housing 10 by bottom plate 32, filter 24, and filter 34 positioned above filter 24 concentric therewith and separated therefrom by annular baffle 36.

Filters 24 and 34 are formed of a woven stainless steel mesh, fine plastic mesh, glass fibre mesh or the like wrapped about stiff core screens 25, 35 respectively. In the embodiment shown in FIG. 1, filter 24 preferably has a thickness of about 1 inch and filter 34 has an increased thickness of about 3 inches.

The plurality of spray nozzles 40 are centrally disposed within chamber 30 by axially aligned pipe 42 in communication with a supply of liquid such as water under pressure by means of conduit 44 extending through bottom wall 16. Each of nozzles 40, disposed at 90° intervals about pipe 42, is adapted to spray a rectangular pattern 31 which completely envelops filters 24 and 34 to provide an effective wetting of said filters.

In operation, the embodiment of my invention as shown in FIG. 1 is adapted to be seated on the top of a duct or exhaust stack for direct discharge of scrubbed gases to atmospheric air. Gases rising through duct or stack 20 is imparted a rotational velocity in chamber 22 by deflector vanes 26 whereby the centrifugal force provided by the cyclone effect results in impingement of a portion of larger solid particulate and mist against the outer wall 12 of the said annular chamber. Liquid spray from nozzles 40 gravitates downwardly through filters 34 and 24 for discharge into annular chamber 22 and, because of entrainment by the gas stream flowing between deflector vanes 26, a portion of the liquid flow is directed against peripheral wall 12 to wet the surface thereof. This film of water flows by gravity to the bottom of chamber 22 to carry entrained solids and mist droplets which have impinged against wall 22 to drain 28 for discharge from the system exterior of duct or stack 20.

The partially cleansed gas stream flows inwardly from chamber 22 through filter 24 into central liquid-mist chamber 30 counter-current to the direction of sprays 31 for impingement by the said sprays. The filtering effect of wetted-thin filter 24 with a finely dispersed liquid spray thereon counter-current to the gas stream flow removes a substantial portion of remaining solid particulate and is believed to condense vapours such as steam while neutralizing acidic or alkaline fumes and removing odours.

Liquid-mist chamber 30 with its multiple sprays 31 effectively removes remaining fine solid particulate, vapours and mist by wetting the solids and condensing and coalescing vapours with contained mist for removal by the co-current action of wetted thick filter 34.

The continuous washing and drainage of captured solid particulate downwardly through and from filters 34 and 24 by continuous impingement of sprays 31 thereon provides effective self-cleaning of the said filters. The liquid containing pollutants drains into chamber 22, as has been described, for eventual removal from the system.

The gas stream discharging from chamber 30 outwardly to atmospheric air, as indicated by the arrows, has been found surprisingly cleansed of solid particulate, vapours and mist together with odours and acidic and alkaline fumes. A unit of the type illustrated in FIG. 1 adapted to fit a 36 inch diameter stack for the scrubbing of 16,800 fpm of exhaust gas, using 56 gpm of water spray supplied at 15 psig pressure, effectively cleansed the gas stream of deleterious solid particulate, vapours and mist.

The embodiment of my invention illustrated in FIG. 2 comprises a housing designated generally by the numeral 50 adapted to be stationed in-line with a gas duct 52 by means of central opening 54 at the base of the housing 50 and central opening 56 at the top of the said housing.

The gas stream to be scrubbed enters the said unit and is treated in the manner as has been described hereinabove with reference to FIG. 1 and, in this latter embodiment, receives an additional filtering by means of circular filter 58 formed above upper plate 60. Filters 62 and 64 are continuously wetted by a water spray by means of two sets of spray nozzles 66, 68 centrally disposed as indicated. In one particular embodiment of my invention shown in FIG. 2, the second set of nozzles 68 provides an additional 15 gpm of spray water to condense and coalesce steam and other vapours present in the duct gas.

This embodiment of my invention is particularly amenable to extension of the scrubbing unit size by simply adding multiple units vertically for additional centrifugation and/or wet filtration of the gas stream.

The present invention provides a number of important advantages. The method and apparatus are substantially simple and trouble-free in operation and in construction. The self-cleaning action of the unit minimizes maintenance and shut-downs, thereby ensuring a continuous scrubbing action. The centrifugal action provided by the cyclone effect effectively removes larger solid particulate before wet filtration and the counter-current and co-current wet filtration stages, together with the action of the liquid-mist chamber, effectively eliminate remaining fines solid particulate, mist and vapours including steam, acidic and alkaline fumes and noxious odours.

The apparatus is small in size for its capacity and thus can be readily and inexpensively manufactured from corrosion resistant materials such as stainless steel or fibre-glass reinforced plastics such as polyester or epoxy resins.

Multiple units can be readily assembled for in-line or stack-top installations, as necessary, and removed pollutants separately discharged under control in a liquid stream without flow back into the stack or duct.

It will be understood, of course, that modifications can be made in the preferred embodiment of the present invention as described hereinabove without departing from the scope and purview of the appended claims.

I claim:

1. An apparatus for scrubbing a gas stream for removal of contained solid particulate, vapors and mist therefrom which comprises in combination; a generally cylindrical vertically disposed housing having an annular chamber formed at its lower end; means interior of said annular chamber for centrally locating and securing said housing to a duct or stack in axial alignment therewith for communication of a gas stream in said duct or stack with said annular chamber; a plurality of tangential vane means for rotating said gas stream in said annular chamber and subjecting said gas stream to centrifugal forces; first circular filter means above said vane means forming the upper inner wall of said annular chamber; flange means closing the upper end of said annular chamber; second circular filter means substantially concentric with and disposed above said first filter means, said second filter means being radially thicker than said first filter means and separated therefrom by said flange means; a liquid mist chamber located interiorly of said first and second filter means, said mist chamber being closed at its axially opposed ends by a bottom plate means and a cover means; liquid spray means centrally disposed within said mist chamber for discharging a liquid mist onto said first and second filter means and for wetting the outer wall of said annular chamber, said outer wall being wetted by liquid which gravitates into said annular chamber from said filter means, said liquid being thrown toward the wall by the rotating gas stream; and means for draining said annular chamber.

2. An apparatus as claimed in claim 1, in which a third filter means is disposed above and concentric with said first and second filter means.

* * * * *